May 16, 1939. S. H. PELLAR 2,158,910
PIE MAKING MACHINE
Filed Feb. 29, 1936 5 Sheets-Sheet 4
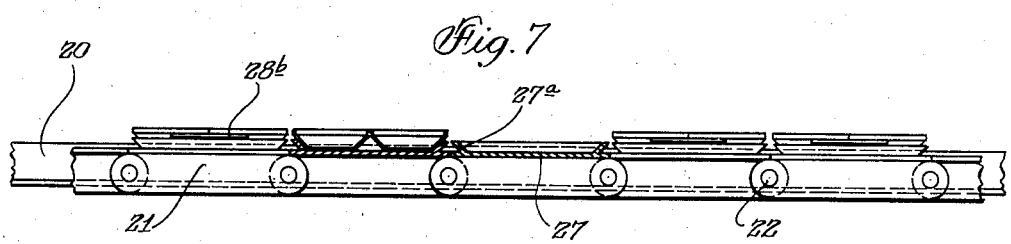
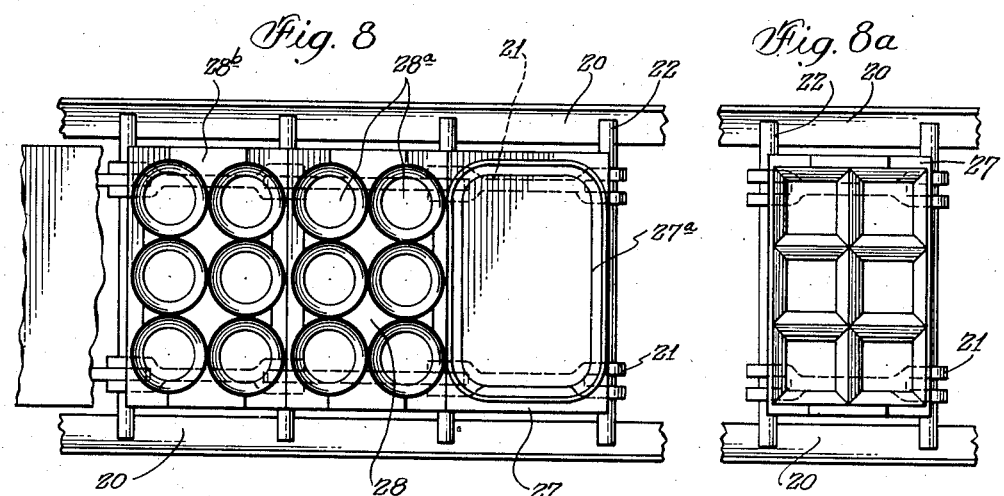
Inventor:
Sidney H. Pellar.
By: Stevens & Batchelor
Attys.

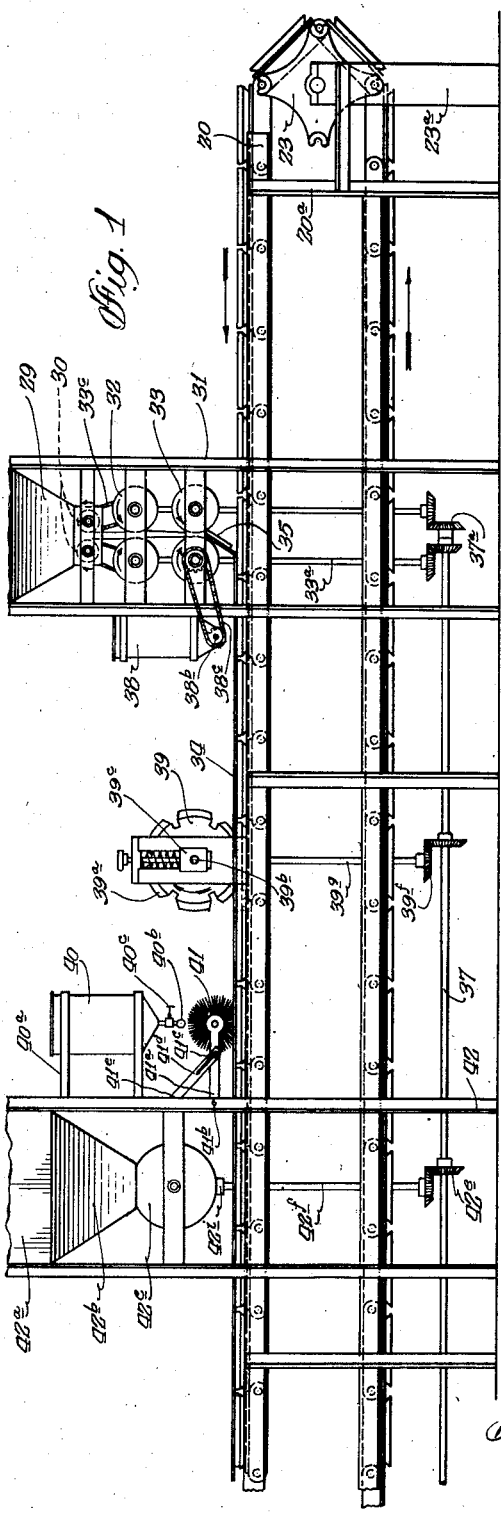

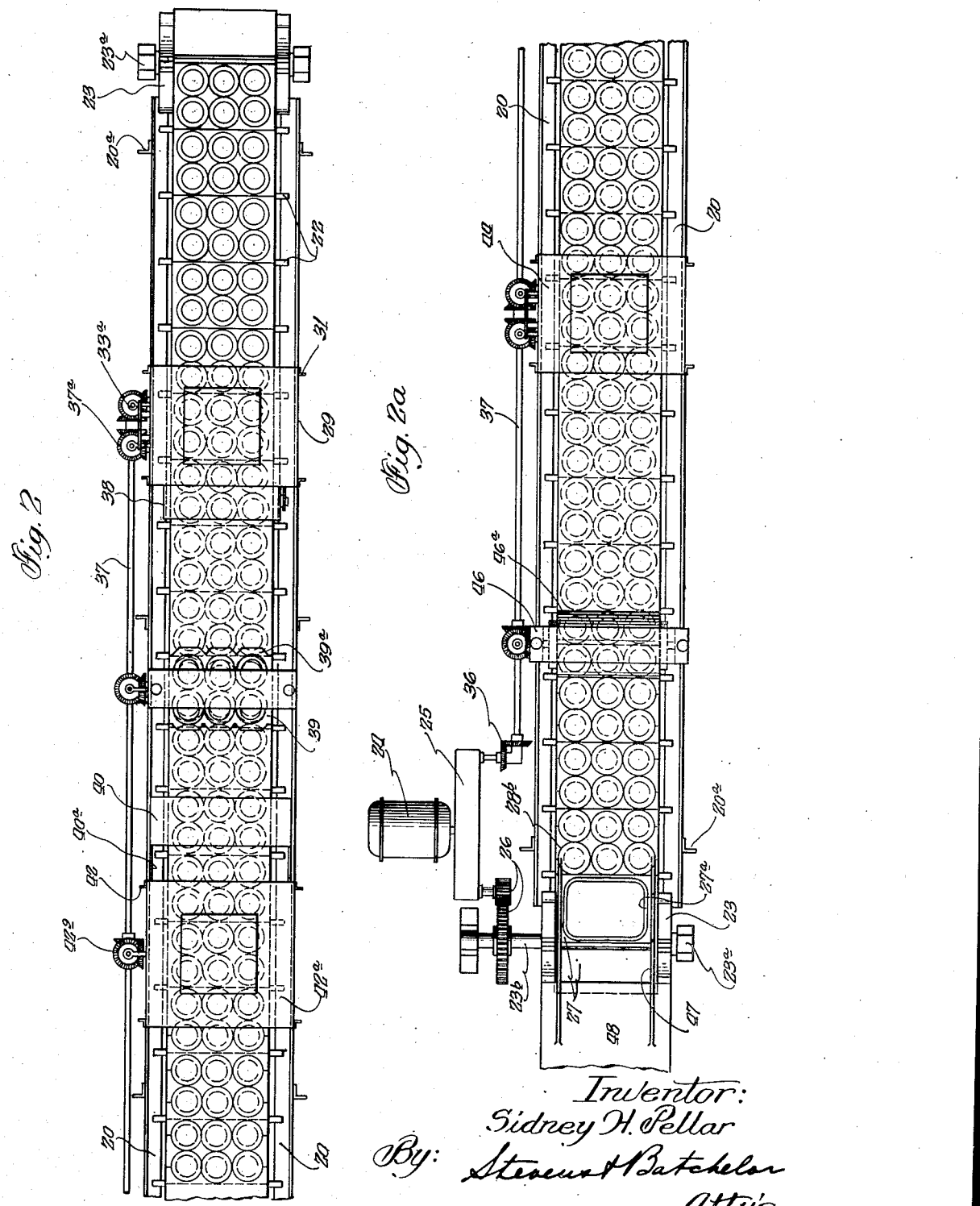

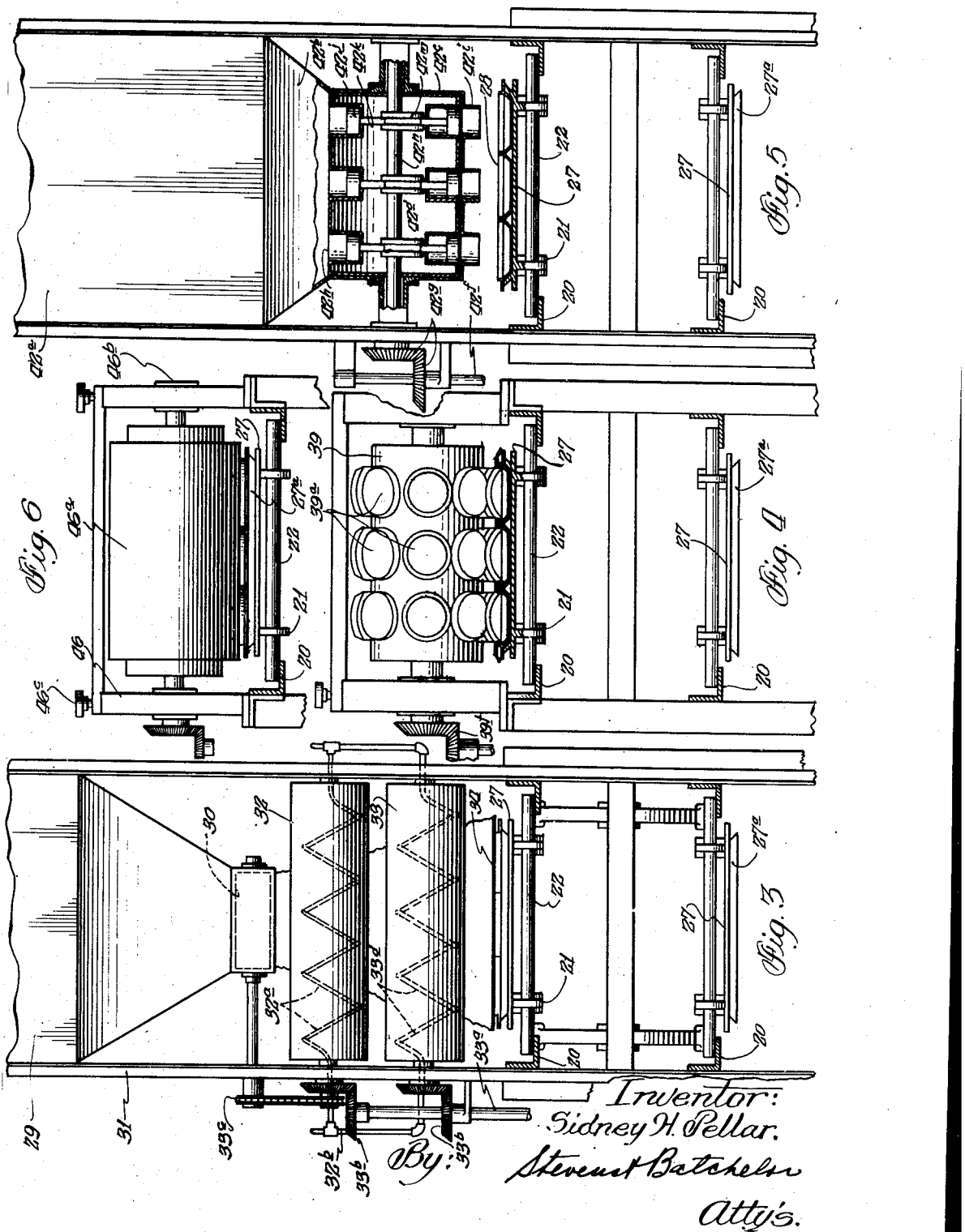

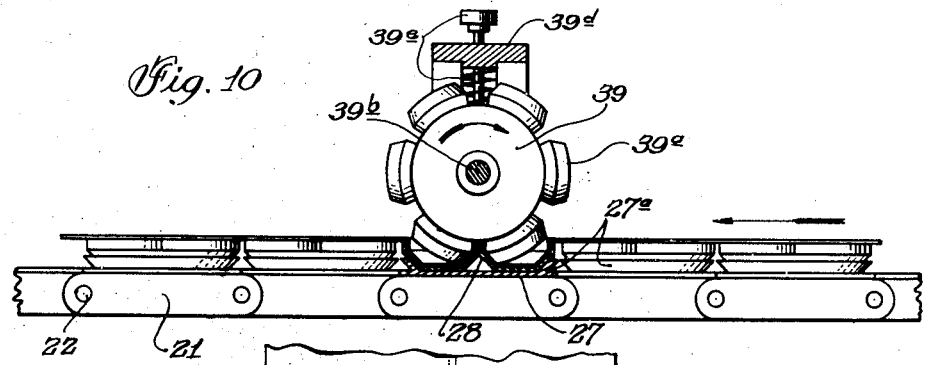
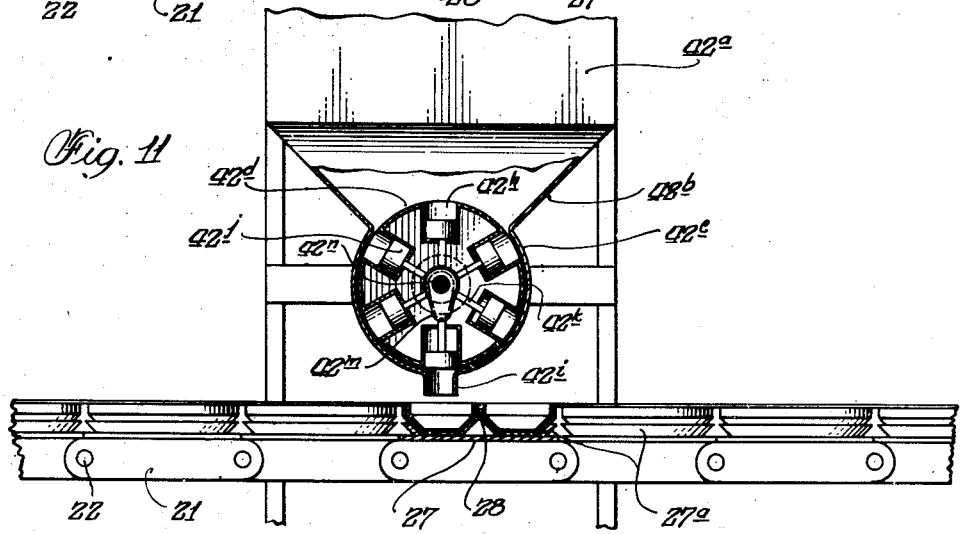
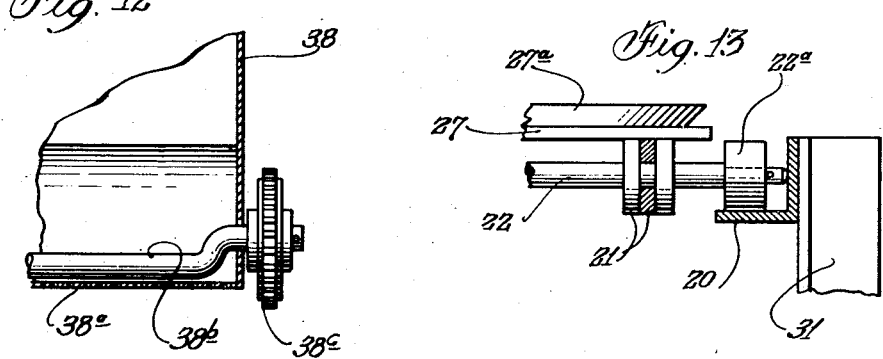

Patented May 16, 1939

2,158,910

UNITED STATES PATENT OFFICE 2,158,910

PIE MAKING MACHINE

Sidney H. Pellar, Chicago, Ill.

Application February 29, 1936, Serial No. 66,486

12 Claims. (Cl. 107—1)

My invention relates to means and methods for the production of pies preparatory to baking the same, and more particularly to the making of small pies popularly called individual pies.

The preparation of pies by conventional methods is almost entirely by hand. In the case of regular-sized pies, the price obtainable usually covers the expenses for materials, use of equipment, and manual labor, so that production may be at a profit. However, in the case of the small or individual pies, the price obtainable—usually 5 cents—so reduces the margin of profit that the cost of production becomes almost prohibitive. Obviously, the necessity of employing manual labor under conventional methods is the dominating factor in the program of expense.

Further, under present methods low efficiency is not the only factor, but some of the product is to a considerable extent inferior. This characteristic occurs in the preparation of the dough for the pie crusts and deals with the waste portions thereof when the pies are trimmed. Such waste portions are usually worked into a new dough to produce more pie crusts, but their quality becomes impaired by the age of the dough and its toughness, which latter characteristic is imparted to the dough as it is kneaded over. Consequently, the pie crusts so formed are heavy, tough, compact and practically indigestible, making the product undesirable.

In order to drastically reduce the cost of making individual pies and also minimize the wastage of dough, I have devised the novel machine about to be described, my main object being to speed up production and so enable the manufacturer to show a fair profit.

A further object of the invention is to eliminate all manual labor for the formation of the pies, and only employ such attendants as supply the material, keep the machine in order, and take the product to the baking ovens.

A still further object of the invention is to provide a means and method for the preparation of the pies which is highly sanitary.

Another object of the invention is to design the novel machine for continuous production, whereby to eliminate stoppages and wastes of time.

An additional object of the invention is to construct the novel machine with a set of units which apply the proper and timely treatment to the materials entering into the production of the pies, whereby to utilize and combine the same to the best advantage and create a product which is fresh and of high quality.

An important object of the invention is to build the novel machine along lines of compactness and with the least number of parts consistent with the operations to be performed, so that the machine may not be unduly expensive to manufacture and does not take up too much floor space or otherwise interfere with objects or passage in the premises in which it is installed.

With the above objects in view and any others which may suggest themselves from the description to follow, a better understanding of the invention may be had by reference to the accompanying drawings in which:

Figures 1 and 1a are, respectively, right-hand and left-hand portions of the novel machine in elevation;

Figures 2 and 2a are similar top plan views thereof;

Fig. 3 is an enlarged section on the line 3—3 of Fig. 1;

Fig. 4 is an enlarged elevation; partly in section of a dough-forming unit shown in the center of Fig. 1;

Fig. 5 is an enlarged elevation, partly in section of a filling unit shown in the left-hand end portion of Fig. 1;

Fig. 6 is an enlarged elevation of a dough trimming unit shown in the center portion of Fig.1a;

Fig. 7 is an enlarged elevation of a pie-form conveyor;

Fig. 8 is a plan view of Fig. 7, partly broken away;

Fig. 8a is a modification of Fig. 8;

Figures 9, 9a, 9b, 9c, and 9d are unit sections showing the formation of the pies in several steps;

Fig. 10 is a cross-section of the dough-forming unit of Fig. 4;

Fig. 11 is a cross-section of the filling unit shown in Fig. 5;

Fig. 12 is a fragmental section of a flour dusting device shown on a reduced scale in Fig. 1; and Fig. 13 is a fragmental enlargement of a modified conveyor.

In contemplating the construction of the novel machine, the requisite of continuous production makes it most expedient to employ an endless conveyor. Specific reference to the drawings indicates such a conveyor in Figures 1 and 1a, the same being designed in a single length, so as to begin production at one end and terminate it at the opposite end. This form of conveyor is the most compact, since it occupies a narrow space; however, if it is found more advantageous, a conveyor operating in a circular or otherwise extended path may be employed, such a conveyor being merely a modification which is within the skill of those trained in the particular art.

For the purpose of the present conveyor, a track composed of angle-rails 20 is provided, the conveyor being essentially in the form of links 21 joined on pintles 22, these extending beyond the double chain formed by the links to ride on the track-rails 20. If smoother progress of the conveyor is desirable, the modification of Fig. 13 may be employed, wherein the pintles 22 are provided with rollers 22a which operate on the track-rails.

As indicated in Figures 1a and 2a, the track is mounted on suitable supports 20a, while the ends of the conveyor-chain are trained over sprockets 23 also supported by suitable standards 23a. One set of sprockets is carried by a shaft 23b which receives motion from an electric motor 24 or other power source by way of a suitable speed reducer 25 and gears 26.

Each pair of links in the conveyor-chain rigidly receives a metal plate 27 on the outside, as more clearly shown in Figure 8, and the plate 27 is built up with an integral dished frame or rim 27a. In the frame is adapted to be deposited a sheet metal tray 28 very similar to a muffin pan, being formed with six divisions 28a serving as pans or forms for small-sized or individual pies to be prepared by the machine. While the tray 28 may contain any different number of units, I have found six as a suitable number and not being too few or too many for practical purposes. During the operation of the machine an attendant will have a stack of these trays handy to deposit a few at a time on the receiving end of the conveyor.

In the preparation of the pies, it is generally my first intention to provide and deposit a thin layer of dough in the trays 28, secondly to depress such layer into the individual forms 28a, thirdly to fill the cavities so formed with the pie filling, and finally to form and deposit a top layer of dough upon the filled units whereby to result in the combination of a bottom crust, an internal filling and a top crust.

In taking up the first step of the process just contemplated, the dough forming and feeding unit illustrated in Figures 1 and 3 is employed. In this unit, 29 denotes a large hopper into which several hundred pounds of dough have been deposited. In the bottom of this hopper are arranged laterally spaced rolls 30 between which the dough descends by gravity in a thick ribbon. The unit is supported by a suitable frame 31 straddling the conveyor, and the rolls 30 extend crosswise thereof. The dough issuing from between the rolls 30 meets a pair of similar but more closely spaced rolls 32 some distance below, and likewise a further set of rolls 33 still more closely spaced at a short distance above the conveyor. Thus, with the three sets of rolls operating in unison in the direction indicated by arrows, the result will be the deposit of a thin, flat sheet of dough 34 upon the trays 28 which have been laid and are in progress upon the conveyor, an inclined guide board 35 being provided in the issue zone of the rolls 33 to facilitate the gradual deposit of the dough sheet.

In order that the above action may be in harmony with the motion of the conveyor, I have provided a transmission of power from the motor 24 as indicated in Figures 1 and 2a in the form of gears 36 and shafting 37, with gears 37a, drive shafts 33a, gears 33b and chains 33c to the parts 33, 32 and 30, although any other type of transmission which will secure the desired action can be used. Suffice it to say that the gearing will be so designed as to cause the dough sheet to issue at the same rate as the motion of the trays, in order that it may be deposited thereon as required.

The dough in passing through the rolls is apt to rise in temperature from the pressure and therefore become more pliable or plastic than is desirable. I therefore cause the rolls 32 and 33 to become chilled by installing refrigerant coils 32a and 33d therein, the spindles of the rolls preferably being tubular in order to permit the connections to the coils to be made from the refrigerant piping 32b. In issuing, the sheet receives a dusting of flour from a box 38 carried in front of the structure 31. As more clearly shown in Figure 12, this box is formed with a transverse row of perforations 38a. As a feed for the flour, I provide a simple crank shaft 38b operated by a chain drive 38c from one of the rolls 33, the crank shaft also helping to keep the flour loosened up so as not to pack.

The dough sheet as now in progress is soft, but not so limp that it will settle in the regions of the tray cavities or divisions 28a. As it is necessary for this to occur in order to form the bottom pie crusts, I have provided the dough forming unit more fully illustrated in Figures 4 and 10. It is here seen that this unit is primarily composed of a drum 39 which has blocks 39a in sets of six about its periphery, each set of blocks being arranged to register with the consecutive trays 28 when the drum 39 is rotated in the direction of the arrow and at the same speed as the travel of the trays. The outer portions of the blocks 39a are of course tapered to seat in the pie divisions 28a and impress the dough sheet 34 to assume like form as a bottom pie crust. While the drum 39 may be mounted or adjusted in any suitable manner, it is preferable that it be journaled with its shaft 39b journaled in blocks 39c slidable in a standard 39d, with a spring pressure adjustment 39e for the blocks. The shaft of the drum of course receives motion by way of gears 39f and shafting 39g from the main shaft 37, with proper allowance made for vertical play on the part of the shaft 39b. Thus, the present unit not only presses or forms the bottom crust dough into the tray units but holds the formations as made in one transverse row of units firmly in place while the next row is being distended and pressed into shape, so that the formation of a given row of pie crusts does not distend or distort the previous row of the same.

The trays of bottom pie crust now proceed to a moistening unit shown in the left-hand portion of Figure 1. This unit involves a water tank 40 carried by a framework 40a at a point above the conveyor. The bottom of the tank communicates with a transverse sprinkler pipe 40b controlled by a valve 40c. The sprinkler pipe 40b delivers fine streams of water to a transverse cylindrical brush 41 situated over the dough trays. The brush 41 is carried by a pair of terminal arms 41a pivoted at 41b to a stand 42 straddling the conveyor, and the brush is vertically adjustable over the dough trays by a wing-nut control 41c in the slot 41d of a bracket 41e extending from the stand 42. Thus, the brush 41 may be set at the proper height to roll by contact with the pie dough and moisten the top surface thereof.

The bottom crust trays continue onward to meet a filling unit 42a carried by the stand 42. This unit primarily involves a tall vessel in which the fruit or other pie filling of a semi-fluid consistency is deposited. The container 42a tapers downwardly as indicated at 42b to communicate with a drum 42c which is located a short distance above the trays. As indicated more particularly in Figures 5 and 11, the drum contains a closely fitted cylinder 42d on the inside, such cylinder being hollow and rotatable on a horizontal axis by gears 42e from the main shaft 37, a shaft 42f and final gears 42g. The periphery of the cylinder 42d is sunken with circularly spaced sets of cavities or cups 42h, these being in transverse rows of three to agree with the transverse rows of pie units in the trays 28. While the rows of cavities are in circles of six in the drawings, any other suitable number may be employed which will cause the rows to register with the rows of tray units 28a when the cylinder 42d is geared to operate in harmony with the travel of the conveyor. As seen in Figures 5 and 11, the surface of the cylinder 42 which is exposed to the interior of the filling container 42a is so ample as to assure the filling of the cavities or cups 42h by gravity as the cylinder rotates at a slow rate, and it follows that the fillings are discharged at the bottom into the respective tray units 28a, preferably by way of individual spout extensions 42i of the drum 42c. In order that the discharge of the filling may be positive, the cups 42h are provided with plungers 42j whose stems 42k are directed to follow cams 42m carried by a stationary shaft 42n in the center of the drum 42c. As indicated in Figure 11, the spouts 42i are made narrower on opposite sides than the diameter of the cup interiors in order that the plungers may not fall out of the spouts when in the lowered position, it being understood that their continued travel from the spouts will cause them to be retained and that the weight of the filling will maintain them in contact with the cams 42m. The dimensions and operative characteristics of the filling unit will of course be so calculated as to deposit the proper amount of filling into each of the bottom pie crusts.

A summary of the effect upon the sheet of pie dough so far is illustrated in Figures 9, 9a and 9b. Figure 9 shows the dough sheet over a tray as first deposited by the dough feeding unit. Figure 9a shows a portion of the dough depressed to conform to the cavities in the tray and to define the individual pie crusts 34a; and Fig. 9b shows these crusts to contain the filling 43. The trays so treated now proceed to a second dough delivery unit 44 shown in Figures 1a and 2a. This unit is operated and constituted similarly to the unit 29 and will therefore require no detailed description. Suffice it to say that the unit 44 delivers a dough sheet 45 of a composition and nature to serve as the top crust for the pies; and as such crust becomes laid over the assemblies formed as per Figure 9b, it covers and closes them in the manner indicated in Figure 9c. Since the bottom crusts 34a have been moistened on their top surface, it follows that the rims of the top and bottom crusts will adhere when assembled as per Figure 9c and render the pies complete.

As the pies, constituted as just described, still extend with dough webs in the spaces between the units 28a, it is necessary that such webs be removed in order to separate and confine the pies to their circular form. For this purpose the unit indicated at 46 is employed, the same comprising a stand over the conveyor journaling a transverse roller 46a in blocks 46b which are vertically slidable and controlled by screws 46c and pressure springs 46d to assume a predetermined downward pressure. It is seen in Figures 9b and 9c that the rims of the tray units 28a extend upwardly at the top, so as to present a thin edge. Thus, with the pies in the form illustrated in Figure 9c travelling under the roller 46a, which is of relatively hard material, the pressure of the roller causes the dough to be cut along the rims of the individual pie containers and to fall away from the same, leaving the pies separated, as indicated in Figure 9d. Frequently the style or design of individual pies changes to a different form. Thus, where a square pie is to be made, the trays are formed as in Figure 8a, and there is of course no waste of dough between the pies to be cut away, so that the function of the pressing unit in such a case is purely to trim away the dough along the outside of the tray.

With the preparation of the pies completed, it is necessary to remove the trays from the conveyor for transfer to the ovens. While this may be done by any suitable method, a simple way is to have the trays extended laterally with flanges 28b, and to have such flanges mount risers 47 erected on a receiving table 48. Thus, the trays from behind push each terminal tray forward upon the risers 47, which raise the tray out of the conveyor receptacle 27a, the further action of the conveyor serving to push the pie trays ahead along the table 48 from which they pass or are transferred into the ovens.

It is evident from the above description that I have provided a means and method for preparing pies expeditiously and efficiently. First, the machine makes it possible to prepare the pies from the virgin dough, so that when a certain amount of dough is provided in the reservoirs, the baking establishment will have a fairly definite idea of what will fall away as scraps, and therefore, know that all the pies produced have the freshness and quality of the virgin dough. As contrasted with present methods of baking pies, this is a radical departure in efficiency, since at the present time the proportion of scrap dough is so great that it must be kneaded over and made into sheet dough for the preparation of pies in order that losses may not be sustained. Obviously, the dough so made is to a certain extent stale and also tougher than the virgin dough, so that the resulting product is of inferior quality and harder to digest. It follows, also, when this dough is shaped and leaves its scraps, the next scrap dough will be even more inferior and of a low grade. As pies with inferior crusts are so numerous under the present system because of the large percentage of scrap dough, such pies necessarily form part of the goods delivered to the dealers and consumers and often cause an unfavorable reaction which may be detrimental to the dealer or pie establishment.

In the novel machine, it is noted that the arrangement of trays on the conveyor is so close that a minimum amount of scraps occurs between the pies, and I have found by calculation that the waste factor in my method is no greater than 20%, whereas by present methods at least half of the dough becomes scrap trimmings which must be worked over as previously explained, indicating that about half of the pies produced contain inferior dough crusts. Further, by making the crust from the virgin dough in my machine, the dough is sufficiently tender to require a minimum of shortening, whereas dough which is worked or kneaded over requires more of the same.

The sanitary phase of the preparation of pies by my method is a very important one. Under present methods the dough is handled almost entirely by hand, and the workers do not wash their hands as often as they are expected to, so that the dough handling operations are far from sanitary. It is obvious from a consideration of my method that the dough is never handled after it has been deposited into the supply receptacles, so that the pies are prepared and transferred to the ovens without being touched by human hands.

As to the operation of the machine, I have endeavored to employ the fewest number of parts or units consistent with requirements. Thus, the conveyor is of utmost simplicity, since the very links in its chain form the bases or supports for the pie containers. Such bases are closely grouped on the conveyor, so as to permit the pie containers to be grouped as closely as possible, saving space and permitting a larger production. Also, by having a conveyor of table height and containing several base links within handy reach, it is possible for an attendant to deposit several trays on the conveyor quickly while the same is in motion, which permits greater speed for the conveyor.

As to the pie containers or trays, it is appreciated that their size and make-up is of all around practical value. By grouping the pie units in the trays in sets of six, the trays are a little over a foot wide, and the conveyor is therefore only a few inches wider. This makes a structure which is relatively narrow when shop or baking plant equipment is considered, requiring only narrow space for installation and making both sides of the conveyor very handy to reach, attend or adjust. Furthermore, a conveyor of this type is a comparatively light structure and mechanism, which can be economically operated by a small motor or power plant.

The feed unit 29 is a compact and efficient device, since it concentrates the dough forming and delivery into a relatively small horizontal space. In other words, the dough travels in a vertical course instead of taking up floor space by traveling in a horizontal or inclined course. It enters between the rolls 32 in a thick body, but is by these rollers and later by the rollers 33 pressed and thinned down to the required sheet 34, being dusted with flour by the device 38 in order not to stick when the pressing unit 39 is applied. The dough is now in a normal condition because the refrigeration in the rolls 32 and 33 has properly conditioned the same.

The continuous operation of the tray and dough feeds not only causes a uniform supply of the dough sheet upon the trays but perfectly synchronizes the forming or pressing unit 39 with the trays so as to register accurately and hold the crust as formed in one set of tray units while the dough in the next set is pressed. The unit 39 is a very simple expedient to accomplish these operations, and it is of course adjustable to exert the proper pressure on the dough crust.

The filling unit 42a is also a simple expedient toward supplying the bottom crusts with the pie filling. The fact that this unit is also synchronized with the motion of the trays assures the proper registration of the filling outlets or spouts with the corresponding tray units, and it is only a matter of calculation and experiment to so design the filling unit as to operate efficiently. Being devoid of springs or delicate parts or instrumentalities, this unit may be maintained in a sanitary and properly working condition without appreciable attention.

The trimming unit 46 is also a simple expedient toward removing the scraps or waste of dough from the completed pies. It is seen that no special cutting mechanism is employed, since the upstanding rims of the pie containers themselves act as knives when the roller 46a presses over them at the same rate of speed as the travel of the trays, so that the scraps fall away and can be removed with facility. Finally, the simple method of removing the trays from the conveyor also makes for dispatch in the transfer of the pies toward the ovens.

In conclusion, it will be apparent that I have evolved a new means and method for preparing pies in two important respects, viz., by making the operation continuous, and by feeding the dough sheets in ribbon form, to be shaped, filled and closed in the proper order, and so combine the parts of the pie into a complete article which is of required form, firmly assembled, of high quality and capable of being produced at the highest speed consistent with its proper preparation.

Although I have described and illustrated the novel machine along more or less specific lines, it is apparent that it is capable of various minor changes and refinements, and I therefore claim all such changes and refinements as coming within the scope and spirit of the invention as covered in the appended claims.

I claim:

1. A pie making machine comprising, means for forming continuously a continuous ribbon-like sheet of dough and continuously feeding the same at one level, means for continuously moving said sheet in one direction, means for treating said sheet to render at least the upper surface thereof non-tacky, a unit continuously and progressively impressing substantially said entire moving sheet with cavities, means for successively filling said cavities as said sheet moves along, means for simultaneously forming and continuously feeding a second continuous ribbon-like sheet of dough upon said first sheet to overlie the same and said filled cavities, and means for separating the completed assemblies of dough sheets to define the pies.

2. The structure of claim 1, and said impressing unit comprising a rotary unit having sheet impressing portions movable in the same direction as said sheet.

3. A pie making machine comprising a dough container having an outlet, means for the compression of the dough issuing from said outlet into a continuous ribbon-like sheet, means for feeding said sheet continuously at one level, means for continuously moving said sheet in one direction, means for treating said sheet to render at least the upper surface thereof non-tacky, a unit continuously and progressively impressing substantially said entire moving sheet with cavities, means for simultaneously forming and successively filling said cavities as said sheet moves along, means for continuously feeding a second continuous ribbon-like sheet of dough upon said first sheet to overlie the same and said filled cavities, and means for separating the completed assemblies of dough sheets to define the pies.

4. The structure of claim 3, and means for moving said dough continuously through said outlet in said container.

5. The structure of claim 3, a pair of spaced rolls in said container outlet, said rolls being operable in unison to move said dough continuously out of said container.

6. The structure of claim 3, and said dough compressing means comprising at least a pair of spaced rolls operating in unison to compress the dough passing therebetween.

7. The structure of claim 3, said dough compressing means comprising a pair of spaced and opposed rolls operating in unison to compress the dough passing therebetween, and a second pair of opposed and more closely spaced rolls operating in unison to further compress the dough passing therebetween.

8. A pie making machine comprising an elevated dough container having an outlet in the bottom thereof, means for moving the dough in said container continuously through said outlet, a pair of opposed and spaced rolls directly below said outlet and operating in unison to compress the dough issuing therefrom into a continuous ribbon-like sheet having a substantially uniform width and thickness, a second pair of spaced and opposed rolls directly below said first mentioned pair of rolls and having their axes parallel thereto, said second pair of rolls being more closely spaced than said first pair and being operable to compress said sheet further to lessen its thickness but increase its width, means for receiving said sheet from said second pair of rolls and continuously moving it in one direction in a substantially horizontal plane, means for treating said sheet to render at least the upper surface thereof non-tacky, a unit continuously and progressively impressing substantially said entire moving sheet with cavities, means for successively filling said cavities as said sheet moves along, means for simultaneously forming and continuously feeding a second continuous ribbon-like sheet of dough upon said first sheet to overlie the same and said filled cavities, and means for separating the completed assemblies of dough sheets to define the pies.

9. The structure of claim 8, said first named means comprising a pair of opposed and spaced rolls mounted adjacent said container outlet, said last named rolls being directly above said first and second pairs of rolls and having their axes parallel thereto, said last named pair of rolls being spaced apart a distance greater than said first pair, and said last named rolls being operable in unison to continuously move said dough through said outlet.

10. The structure of claim 1, and means for continuously dusting the entire upper surface of said first sheet with flour before it is impressed by said unit.

11. The structure of claim 1, said means for continuously moving said sheet in one direction comprising an endless conveyor, said conveyor having its sheet engaging surface formed to provide a continuous series of depressions, and said sheet impressing unit and said conveyor being synchronized to impress said cavities in the zones of said depressions.

12. The structure of claim 1, said cavity filling means comprising a vessel containing pie filling material, said vessel being situated above said sheet, a tubular extension in the bottom of said vessel, a cylindrical member rotatable in said extension, peripheral cups formed on said member and adaptable in top position to receive material from said vessel and in bottom position to discharge material into said cavities, plungers in said cups to insure the positive discharge of said material when said cups are in the bottom position, means for actuating said plungers to discharge said material, said last named means comprising a stationary shaft axially of said cylindrical member, a cam carried by said shaft and engageable with the inner ends of said plungers to actuate the same to discharge said material when said cups reach the bottom position.

SIDNEY H. PELLAR.